(No Model.) 3 Sheets—Sheet 1.

P. R. HUNT.
CORN HARVESTER.

No. 388,684. Patented Aug. 28, 1888.

Witnesses
Albert Speiden
Wm. G. Galloway

Inventor
Preston R. Hunt
By his Attorneys
Anderson & Myers (No Model.) 3 Sheets—Sheet 2.

P. R. HUNT.
CORN HARVESTER.

No. 388,684. Patented Aug. 28, 1888.

Witnesses.
Albert Speiden
Wm. J. Galloway

Inventor.
Preston R. Hunt
By his Attorneys.
Anderson & Myers (No Model.) 3 Sheets—Sheet 3.
P. R. HUNT.
CORN HARVESTER.
No. 388,684. Patented Aug. 28, 1888.
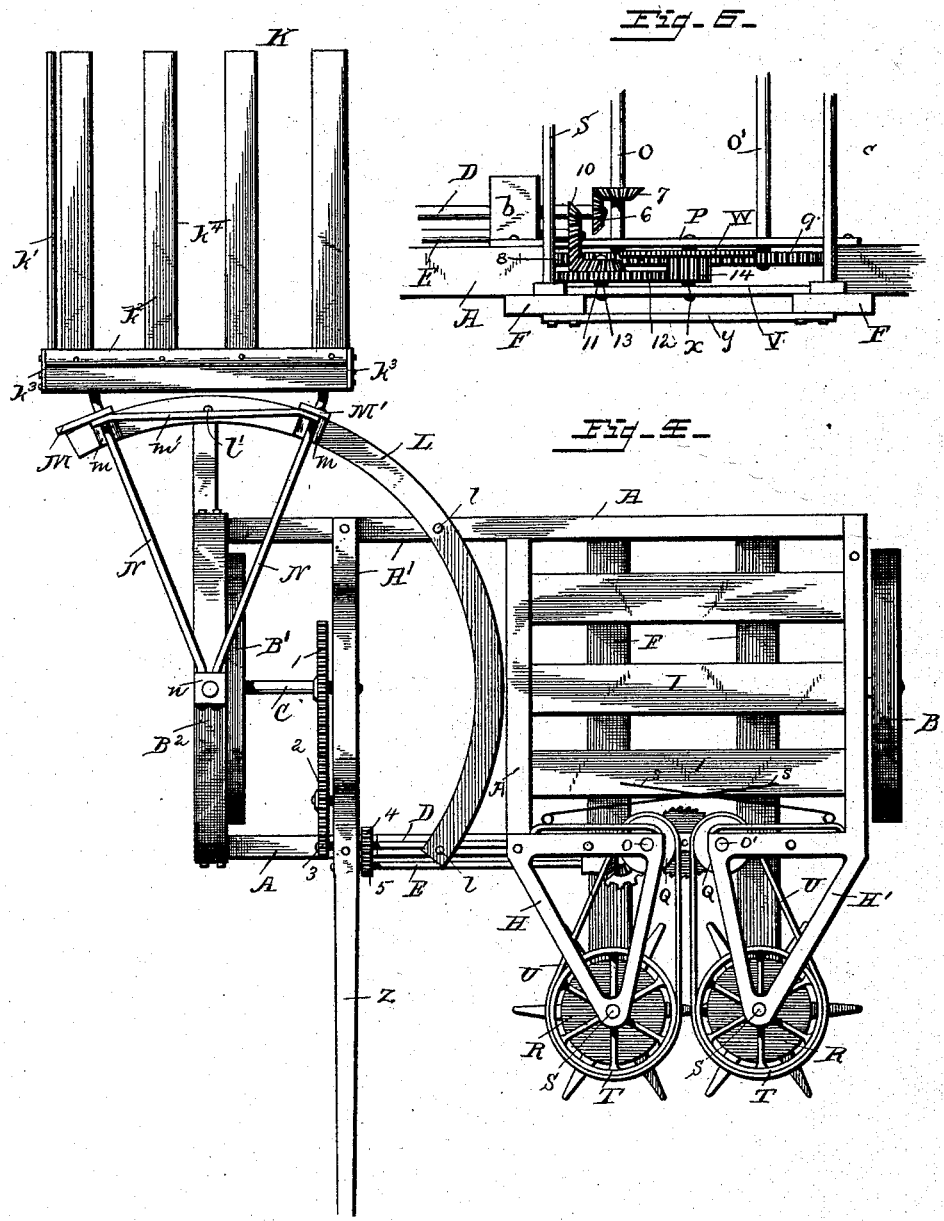
Witnesses.
Albert Speiden.
Wm. G. Galloway.
Inventor,
Preston R. Hunt
By his Attorneys
Anderson & Myers.

UNITED STATES PATENT OFFICE.

PRESTON R. HUNT, OF PLATTSVILLE, ASSIGNOR OF ONE-HALF TO ALBERT J. CORY, OF TAWAWA, OHIO.

CORN-HARVESTER.

SPECIFICATION forming part of Letters Patent No. 388,684, dated August 28, 1888.

Application filed March 10, 1888. Serial No. 266,847. (No model.)

*To all whom it may concern:*

Be it known that I, PRESTON R. HUNT, a citizen of the United States of America, residing at Plattsville, in the county of Shelby and State of Ohio, have invented certain new and useful Improvements in Corn-Harvesters, of which the following is a specification, reference being had therein to the accompanying drawings.

My invention relates to mechanism for harvesting corn; and it has for its object the production of a machine of this class which, being drawn over the field by horses, will automatically cut the standing corn and deliver it into a rack until sufficient has accumulated therein to form a shock, which rack, after the stalks have been bound together, may be swung around to deposit the shock on the ground at the side of the machine.

The invention consists in certain details of construction, which will first be described in connection with the accompanying drawings, and then clearly pointed in the claims.

Figure 1:
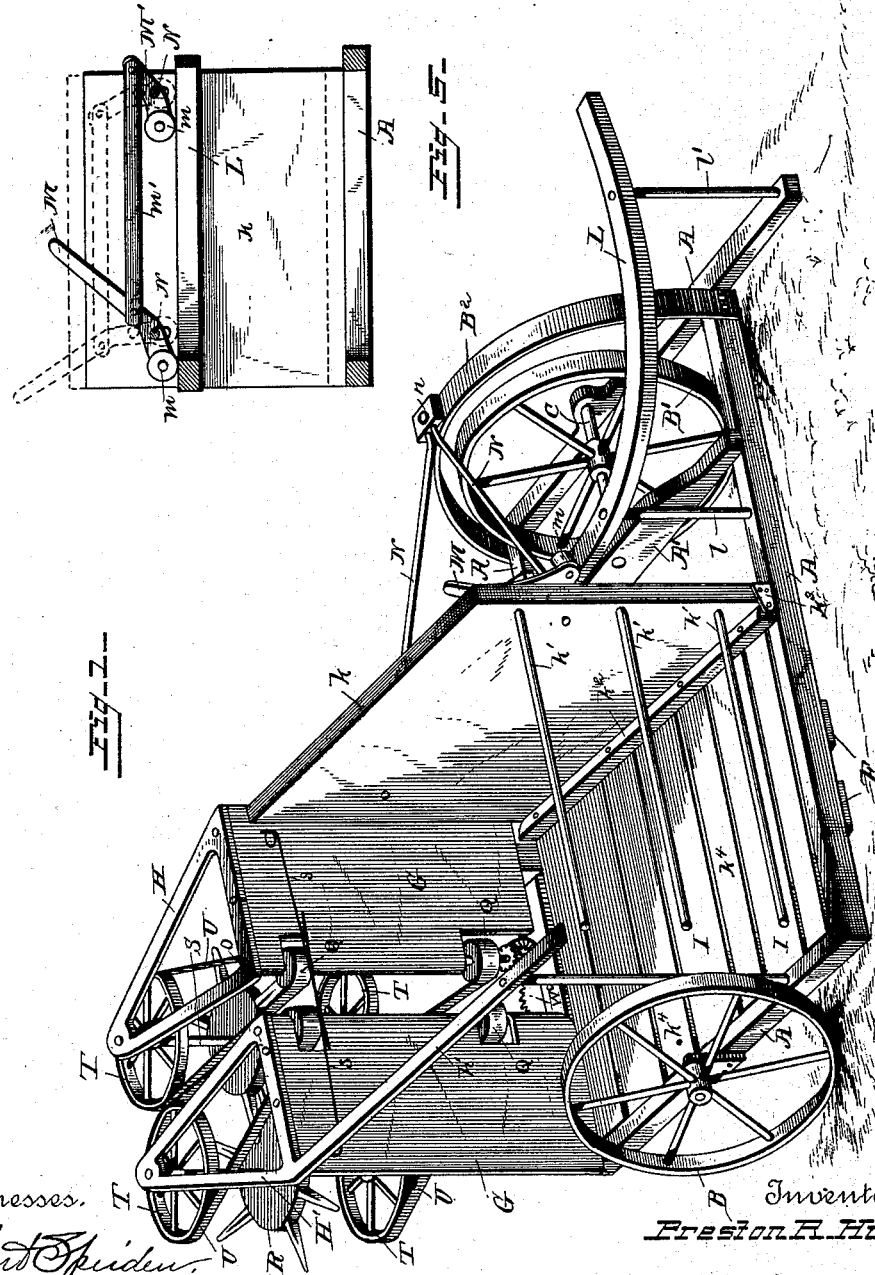
Figure 2:
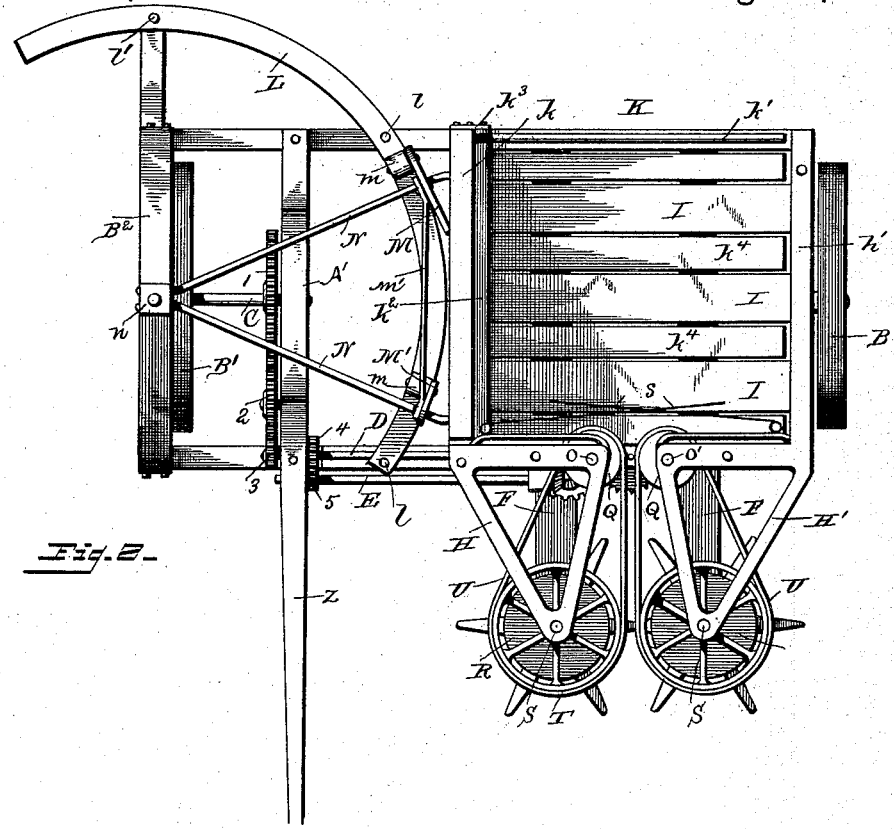
Figure 3:
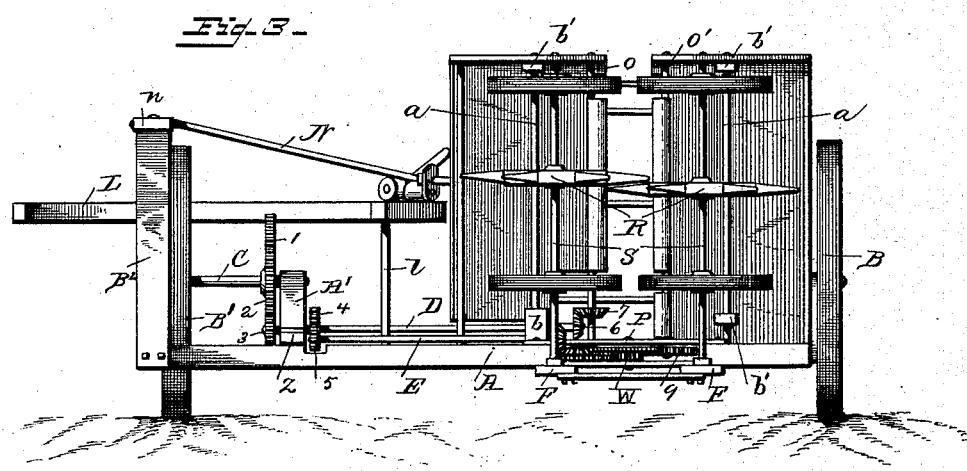

Figure 1 of the drawings is a perspective view of the machine, looking from the rear. Fig. 2 is a plan view of the machine with the rack in its normal position. Fig. 3 is a front elevation of the machine. Fig. 4 is a plan view of the machine with the rack swung to one side to deposit the shock. Fig 5 is a detail view of the cam-levers for operating the rack. Fig. 6 is an enlarged detail view of the main portion of the gearing.

Referring to the drawings, A A represent rectangularly-arranged beams and a central cross-rail, which constitute the main frame of the machine; A', a cross-beam extending from the front beam to the rear beam of the main frame near one end, and B B' the carrying-wheels.

One of the carrying-wheels, B', which serves also as the driving-wheel, is rigidly secured to a short shaft, C, journaled in a bearing on one of the end beams of the main frame and in the cross-beam A', on which shaft is also secured a gear-wheel, 1, which meshes with a pinion, 2, journaled in the frame A, as clearly shown in Figs. 2 and 4. This pinion in turn meshes with another pinion, 3, secured to a horizontal shaft, D, one end of which is mounted in the front end of the cross-beam A', and the other end in a block, $b$, secured on top of the front beam of the main frame, as seen clearly in Fig. 3. On this shaft, near to the pinion 3, is secured another pinion, 4, in mesh with a pinion, 5, on another horizontal shaft, E, also mounted in the cross-beam A' and block $b$ and lying parallel with shaft D.

F F represent two forwardly-extending supporting-bars secured to the under side of the frame.

G G represent vertical boards, preferably of sheet metal, secured, in alignment a short distance apart, to blocks $b$ and $b'$, on rods $a$, secured in and rising perpendicularly from the front rail of frame A. The inner edges of these boards are rounded by being turned inwardly, as seen in Figs. 1 and 3.

H H' are triangular brackets mounted at their rear ends on the upper ends of rods $a$, the brackets resting on shoulders (not seen) on said rods, and the ends of the rods being riveted down onto the brackets, the outer ends of the brackets being supported by rods S, hereinafter mentioned. One of these brackets, H', has a rearward extension, $h'$, which, in connection with the rack hereinafter described, serves to support the cut stalks.

In rear of the boards G G boards I are secured transversely to the frame at a short distance apart, forming what, for the purpose of description, may be termed the "floor."

K represents the rack, composed of a vertical side board, $k$, a series of horizontally-extended rods, $k'$, secured vertically along the rear end thereof, a bar, $k^2$, pivoted at both ends, as at $k^3$, to the lower edge of the side board in such manner as to fold up against the said board when desired, but not to fall below a horizontal position, this being accomplished by simply rounding off the upper edge of the bar next the side board, as seen, and a series of horizontal slats, $k^4$, secured at one end to said bar, and at such a distance apart as will allow them to enter and fill the spaces between the boards I when the rack is in its normal position.

L is a segmental track or way, consisting simply of a narrow piece of timber curved in the arc of a circle and having a smooth upper surface. It is mounted on standards $l$, rising from the front and rear beams of the main frame between the rack and driving-wheel, and curves to the rear of and outside the path of said wheel, it being further supported near its rear end by another standard, l', rising from the rearwardly-extended end beam of the main frame, as seen in Figs. 1, 2, and 4.

M M' are cam-levers bearing friction-rolls m m on their lower ends, and hung on rods N, the inner ends of which are secured in the side board of the rack, while their outer ends converge and are secured in a block, n, which is swiveled on a wheel-guard, B³, consisting of a strip of sheet metal curved over the driving-wheel and secured to the front and rear beams of the frame, the said levers being coupled together by a bar, m'. These levers are for the purpose of raising and lowering the rack, and also for carrying it backward and forward on the track, during which operations the lever M is held by the operator.

Shaft D carries on its inner end a bevel pinion, 6, which meshes with another bevel-pinion, 7, on a vertical-shaft, O, the upper end of which is journaled in bracket H, while its lower end passes through a metal plate, P, spanning an opening left by cutting out a section of the front beam of the main frame to provide room for the saw and gear-wheels, and bears a pinion, 8, which gears with a like pinion, 9, on the lower end of another vertical shaft, O', in all respects similar to shaft O, both shafts O and O' bearing small band-pulleys Q and serving as drivers for the feeders.

R represents feeders, which consist of wheels provided with radiating arms, the said feeders being keyed to vertical shafts S, journaled in the outer ends of supports F and brackets H H'. These shafts also bear band-pulleys T, which are connected with pulleys Q by means of belts U. Shaft E bears upon its inner end a bevel-wheel, 10, in gear with another bevel-wheel, 11, which latter, together with a gear-wheel, 12, immediately below it, is fixed on a stud, 13, rising from a plate, V, secured to the supports F, as clearly shown in Fig. 6.

W represents a circular cutter, mounted on a short shaft, X, journaled in plates P and V, the said shaft being also provided with a pinion, 14, with which gear-wheel 12 engages.

Y is a metal plate secured to the under side of supports F, a short distance in rear of the cut of saw W, for the purpose which will hereinafter appear.

Z is the tongue, secured to the frame about midway between the rack and the outer carrying-wheel. I have found that this location of the tongue is unobjectionable, for as the machine is light and the feeders offer but little resistance to the draft there is but little tendency on the part of the machine to vary in its course. However, any such tendency may be effectually avoided by making the inner carrying-wheel, B, slightly larger than the outer one, B', and thus counteract the side draft.

The operation of my machine is very simple. As it is drawn across the field with the feeders in line with a row of corn, they (the feeders) engage with the stalks and direct them between the belts, by which they are kept from bunching, and when the cutter strikes them they are severed by it, the plate Y then bearing down the stubs, and thus preventing them from coming into contact with the gear-wheels. After the stalks are severed they pass through the opening between the boards G and onto the rack and against two spring-wires, s, secured to the boards G a short distance from the top and near their outer edges, the free inner ends of these wires overlapping each other at the opening between the inner edges of the boards. The resilience of these wires maintains the stalks in an erect position until the rack is about half-filled, when, after passing the wires, they are held erect and cannot fall flat by reason of the support afforded by the side and end of the rack itself and the railing formed by the extension of bracket H'. When sufficient stalks have accumulated to form a shock, they are banded together. The cam-lever M is then drawn or pushed backward, (which also draws lever M' backward,) thus raising the rack high enough to cause slats $k^4$ to clear the floor, when the rack may be carried around to the rear of the machine on the track, in order to deposit the shock out of the way.

Having thus described my invention, what I claim as new, and desire to secure by Letters Patent, is—

1. In a wheeled corn-harvester, the combination, with a circular cutter mounted horizontally in the front side of the main frame and mechanism for operating the cutter, of a receptacle for cut stalks in rear of the cutter, two sets of belts in front of the receptacle, one on each side, the belts of each set traveling in the same plane, one vertically over the other, for directing the stalks to the cutter and thence to the receptacle, two wheels having radiating arms arranged in the same horizontal plane, one at each side of the receptacle, between the two belts composing each set, for directing the stalks to the belts, and mechanism, substantially as described, for operating the belts and feed-wheels.

2. In a wheeled corn-harvester, the combination, with the frame having a floor formed of transverse slats, as described, of a swinging rack having bottom slats adapted to fit between the slats of the floor, a wheel-guard to which the rack is pivoted, cam-levers pivoted to one side of the rack coupled together by a bar and provided with friction-rolls at their lower ends, and a fixed segmental track mounted on the main frame at one side of the machine, upon which said friction-rolls travel, for the purposes stated.

In testimony whereof I affix my signature in presence of two witnesses.

PRESTON R. HUNT.

Witnesses:
S. F. APPLE,
S. M. MARTIN.